July 20, 1954 R. E. DIETERICH 2,684,223
ROOF MOUNTED BRACKET FOR AUTOMOBILE VISORS
Filed Aug. 7, 1951 2 Sheets-Sheet 2
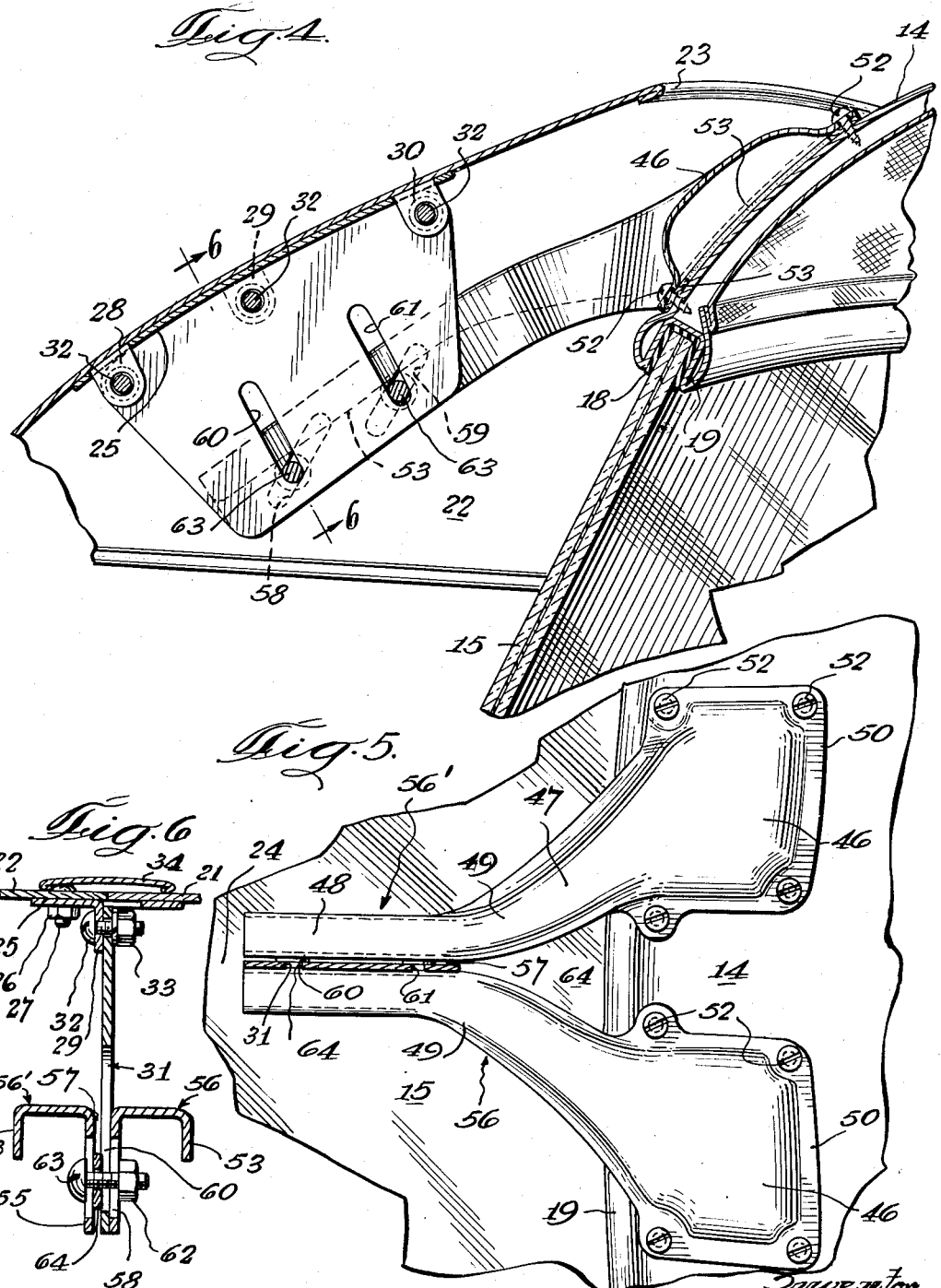

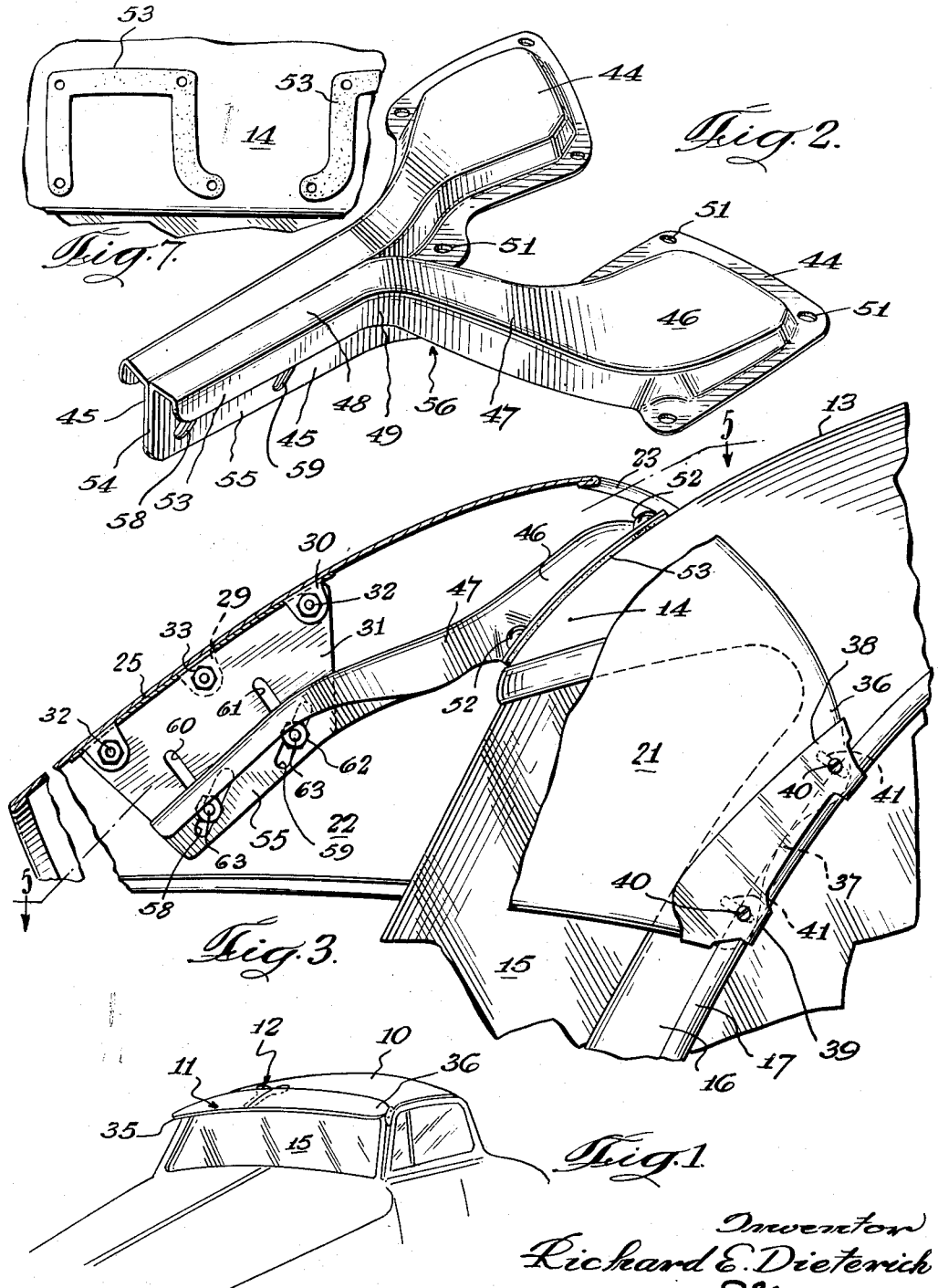

Patented July 20, 1954

2,684,223

UNITED STATES PATENT OFFICE 2,684,223

ROOF MOUNTED BRACKET FOR AUTOMOBILE VISORS

Richard E. Dieterich, Long Beach, Ind.

Application August 7, 1951, Serial No. 240,710

3 Claims. (Cl. 248—201)

This invention relates to visors or windshield shades mounted on the exterior of an automobile and more particularly is directed to the construction of a bracket for supporting the center of the visor in shading relationship to the windshield from the roof of the automobile, the ends of the visor being secured to the gutters alongside said windshield. Although not limited thereto, the bracket embodying the invention may find more advantageous use in connection with supporting visors in shading relationship to the so-called one-piece windshields as distinguished from windshields having divider strips.

In order to provide a desirable construction for windshield visors to be mounted on present day automobiles it is advantageous that there be no structure obstructing the driver's vision as may be occasioned by the use of bracing members engaging the cowl of the automobile or the divider strip on so-called two-piece windshields. It is one of the objects of this invention to provide for a construction which will permit unobstructed vision through the windshield from within the vehicle.

Due to the increased speeds at which modern automobiles are adapted to be driven, the visor must be supported in shading relationship to the windshield in a manner free of any danger of becoming unfastened; must be able to withstand the tremendous wind pressures to which it is subjected when the automobile is driven at high speeds, and must be able to eliminate the likelihood of the visor becoming distorted or buckling. Accordingly, another object of the invention is to provide a bracket of the character described for supporting the visor on the automobile with the attendant advantages above described.

Another object of the invention is to provide a novel bracket which will be supported on the automobile roof, which will be durable and sturdy, which will be stable on the roof, all without placing undue strain thereon.

Another object of the invention is to provide a bracket of the character described which is formed of a pair of mating parts providing a bifurcated end being supported over a relatively great area of the roof whereby to provide strong support for the trailing edge of the visor while retaining the same spaced over the roof of the automobile.

Another object of the invention is to provide a bracket of the character described having improved means for providing rigid and secure attachment thereof to the roof of the automobile and improved means for positively engaging said visor at the center thereof for adequately and properly supporting same over the windshield.

Another object of the invention is to provide a bracket of the character described for use with various visor constructions; which is simple and easy to manufacture and inexpensive to fabricate; which may be mounted without necessitating great mechanical skill; and formed of a pair of mating parts, each adapted to be manufactured by a minimum of operations and with small loss of material due to waste.

Still another object of the invention is to provide a bracket of the character described which is formed of a pair of substantially crank-shaped members providing a pair of bases for securing the bracket to the roof of the vehicle, said bases being spaced apart so as to clear an accessory centrally mounted on said roof.

A further object of the invention is to provide a bracket which is formed of a pair of members, either of which is adaptable for use alone to support a visor in windshield-shading relationship.

Still a further object of the invention is to provide a bracket of the character described formed with at least one cantilever beam of generally channel cross-section providing great strength and resistance to bending.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of an automobile having a visor supported from the roof thereof by means of the bracket embodying the invention and showing said bracket in position for supporting said visor.

Fig. 2 is a perspective view of a pair of opposite crank-shaped members generally disposed in the manner in which they are placed in forming the mounting bracket.

Fig. 3 is a fragmentary elevational view of the windshield portion of the automobile showing a visor and my bracket attached thereto, portions of the visor and the windshield being illustrated in section to show constructional details.

Fig. 4 is a median sectional view through the visor and bracket taken generally along the center line of the automobile and through the bracket.

Fig. 5 is a top plan view of the bracket embodying the invention and showing same in position on the roof of the automobile, taken generally along line 5—5 of Fig. 6.

Fig. 6 is a sectional view through the visor and bracket taken along the line 6—6 of Fig. 4 and in the direction indicated.

Fig. 7 is a fragmentary top plan view showing the gasket in position on the roof of the automobile for mounting the bracket thereover.

The bracket embodying the invention is adapted to be used to support a visor ordinarily made of metal which is in the form of a curved member which extends in an arc between the windshield pillars across the front of the vehicle directly above the windshield. The visor proper may be formed of a single panel suitably curved and shaped to conform with the lines of the automobile or it may consist of more than one panel suitably joined either at the center or at other points. A preferable form of the visor is one which consists of two mating mirror parts having flange members at the center of the visor and engageable with a vertically disposed fin so that when the contiguous ends of the panels are juxtaposed, there is provided a depending fin or plate member at the center to cooperate with a suitable element of the bracket for supporting the center of the visor.

The depending fin of the visor is arranged to be received between a pair of spaced apart beams formed on the bracket in sandwiching relationship therewith. The juncture of the flange members and the depending fin of the visor is rendered secure by suitable fastening means.

Obviously, the depending fin of the visor may be formed of the visor material itself, may be in the form of a punched out flange, may be welded or otherwise attached at the center of the visor on its underside, all within the scope of the invention. Said depending fin need not necessarily be secured in sandwiched relation between the beams of the bracket but obviously could straddle a beam or beams formed on the bracket and sandwich said bracket beams in a reversal of parts. It is preferred, however, to have the arrangement referred to and hereinafter described because of the simple and sturdy attachment making for foolproof assembly of the visor and bracket.

The visor ends are not of importance so far as this invention is concerned, except of course, insofar as they provide securement of the visor to the vehicle. I have shown the visor ends attached to the automobile gutters by clamping means known in the art, but it should be understood that the ends of the visor could be screwed or welded to the gutters, could be readily attached by screw members to the windshield pillars, or could be fastened by divers ways. The illustration of only one method of the attached should be sufficient.

Referring now to the drawings, in Fig. 1 there is shown an automobile 10 having my visor designated generally 11 and bracket designated generally 12, installed thereon. The vehicle 10 is of well known construction and forms no part of the invention. Said vehicle has a roof 13 having at least a rigid front portion 14 which curves downwardly to meet the glass windshield 15, same being shown as a single curved pane of glass without a central divider strip. It will be understood that the invention is not restricted to windshields above described, but also may be used with windshields consisting of two planar or curved halves joined at the center of the windshield by a divider or molding strip.

Various constructions for windshields are known in the art, but I have shown same supported on opposite sides by pillars 16 which in turn are bordered by rain gutters 17 of the usual U-shaped construction, following the contours of the vehicle 10 and secured to the pillars 16. The windshield is fixed in place by means of rubber channels 18 or the like extending around the windshield, and anchored in any suitable metal molding 19, whereby a water-tight securement is provided.

The visor 11 is formed of a pair of elongate panel members 21 and 22 which ordinarily are curved gracefully to conform with the contours of the vehicle 10. The visor is mounted above the windshield 15 in shading relationship thereto and preferably in position with the trailing edge 23 thereof overlying the front rigid roof portion 14 whereby to exclude direct sunlight from the top of the windshield. Certain features of the invention make this arrangement preferable although it will be understood that this is not absolutely essential.

The visor 11 is provided at its center with a juncture 24 of the two panels 21 and 22, said juncture lying on a line corresponding with the front-to-rear axis of the vehicle. Mounted over the juncture 24 on the underside of the visor is a central plate member 25 secured to said panels by means such as nuts 26 and bolts 27 inserted therethrough. Said plate 25 has formed thereon a plurality of punched out ears 28, 29 and 30 adapted to be secured to a depending plate or fin 31 by suitable fastening members such as bolts 32 and nuts 33 engaged through suitable openings respectively in said fin and flanges. There may be provided an ornamental cover plate 34 superimposed on said juncture 24 which may be held in place by any suitable fastening means, such as screws or nuts and bolts (not shown). This cover plate is only illustrated in Fig. 6 so that the other views will be simple and easily understood.

The visor panels 21 and 22 are mirror image constructions and each has a tapered end 36 and 35 respectively which is intended to be fastened to the pillars alongside the windshields. Only one side of the fastening arrangement is described herein since the opposite side is identical. The free end 36 of the visor panel 21 is shown engaged in the crook of the gutter 17 at 37. A fastening plate or bracket 38 engages over the outside of the free end 36, said bracket 38 being provided with a pair of feet 39 hooking around and under the gutter 17, so that the free curl of the gutter is sandwiched between the end 36 and the plate 38. The plate 38 is held tightly by screws 40 which may pass through the plate 38, through slotted openings 41 in the end 36, and may be engaged with suitable cooperative members such as sheet metal nuts (not shown) on the rear of the visor end 36. Of course, the screws 40 may also be passed through the wall of the gutter 17 for securing the end 36 thereat. The visor is made of relatively thin gauge metal and adapted to be slightly twisted and bent to permit limited adjustment of visor pitch, although other means may be provided for this such as the slots 41 in the visor end 36. Also the ends of the visor may be secured into the inside of the doorframe, mounted on the pillars 16 or otherwise secured at their ends to the vehicle.

The bracket 12 provides the sole center support for the visor 11 and its halves are mounted on opposite sides of the center of the roof portion 14 and adjacent thereto. The bracket is comprised of two members 56 and 56' which are identical and opposite in construction so that the details of one member only need be described. The complete bracket has the said members aligned adjacent one the other and is arranged to cover a substantial portion of the rigid roof portion 14 so as to provide a strong and durable support for the center of the visor 11 from the said roof portion. Each member consists of two parts, a base portion 44 which is adapted to be secured to the forward sloped rigid roof portion 14, and a rigidly connected forwardly extending beam portion 45 offset from said base portion and extending a substantial distance forward of the base portion so that it is poised above the windshield 15 and is adapted to be secured to the fin 31 depending from the center of the visor 11. The members 56 and 56' are substantially crank-shaped so as to provide the advantages herein set forth.

Referring to Figs. 2 and 5, the construction of members 56 and 56' comprising the bracket 12 will be considered. As previously stated said members are identical and opposite in construction so that only one need be specifically described. Said member 56 includes a base portion 44 which is formed as a substantially square-shaped hollow dome 46 having an offset portion 47 extending angularly therefrom and an elongate straight portion 48 bent from said portion 47 as at 49, thereby providing a crank-shaped member. As shown in Fig. 4, when the bracket is secured to the forwardly sloped roof portion 14, the straight portion 48 is below the level of the roof portion 14 to which the bracket is secured. The dome 46 is provided with a flange 50 integrally formed therewith which encircles the perimeter of the dome 46. The flange 50 is pierced at the corners thereof to provide openings 51 through which sheet metal screws 52 may be driven into the roof portion 14 for securing the bracket in place. A gasket 53 of rubber or the like is disposed between the flange 50 and the roof portion to enable water-tight connection, same being shown in Fig. 7.

The offset portion 47 and straight portion 48 has a flange 53 formed integral therewith which extends continuously from the dome 46 to the free end 54 of the straight portion 48, said flange being arranged vertically relative to portions 47 and 48. There also is provided a second flange 55 on the opposite side of portions 47 and 48 and integrally formed thereon which constitutes a vertical beam 45 to which the fin 31 is secured. The flange 55 is somewhat longer than flange 53 and extends also from the dome 46 to said free end 54. Said beam serves as a strong cantilever member supporting the center of the visor 11 at its free end 54.

Referring to Fig. 6, it will be noted that providing the flange 53 gives the portions 47 and 48 a channel-shaped cross-section which greatly strengthens the bracket. It will also be noted that the flange 53 is continuous from the dome 46 to the free end 54 so as to curve also around the portion 49 between said portions 47 and 48. The channel-shaped cross section of the bracket prevents lateral distortion of the beam portion 45 when subjected to great wind forces as the automobile is driven at high speed. As a matter of fact, any bending forces are resisted by such construction.

Referring to Figs. 2 and 5, the bracket 12 is shown in assembled condition, as ready to be mounted in Fig. 2 and mounted in Fig. 5 on the roof portion 14. The two members 56 and 56' comprise the bracket 12. In assembling the bracket 12, the members 56 and 56' are arranged adjacent one another and spaced apart along the respective face of the flanges 55 a distance sufficient to provide a slot 57 therebetween in which the fin 31 is adapted to be received. The beams 55 are provided with a pair of spaced slots 58 and 59 arranged angularly relative to the vertical axis of the beams 55 and the fin 31 also is provided with a pair of spaced slots 60 and 61 adapted to be aligned respectively with slots 58 and 59. The fin is disposed in the slot 57 and secured therein by means of conventional fastening members such as bolts 62 and nuts 63. A washer 64 may be disposed between the fin 31 and one of the beams 55, there being a washer for each of the bolts 62. The provision of slots 60—61 and 58—59 permits relative movement between the visor 11 and the bracket 12 to enable pitch and position adjustments.

It will be noted that in the assembled condition, the offset portions 47 divert from each other so as to form a substantially V-shaped space 64 therebetween. By thus offsetting the portion 47 from the base portion 44, when the bracket is mounted, the base portions 44 will be spaced apart on the roof portion 14 a distance considerably greater than that of the beams 55. There is thus provided a bracket whose base, in the collective sense, covers a wider area of the forwardly slope roof portion 14 than is expected in a bracket of this type which actually is relatively small in size. By providing a base on the bracket which covers a large surface of the roof portion 14, great strength is provided in the bracket without increasing its size and weight. Also, the large base of the bracket as provided by the twin base portions 44, 44 serves to decrease the tendency of the roof portion 14 to buckle or strain due to great wind forces when the vehicle is driven at high rates of speed.

Furthermore, by making the members 56 and 56' crank-shaped so as to provide the space 64, same are enabled to clear an accessory which may be centrally mounted on the roof portion 14. Such an accessory may, for instance, consist of an antenna for a radio mounted through the roof portion 14 as is common in certain models of modern automobiles. An accessory thus mounted on said roof portion has not been shown since the construction thereof is known in the art and so that the description will be simple and easily understood.

A highly desirable feature of the bracket 12 resides in the simplicity and ease with which same can be manufactured. Each of the members 56 and 56' may be stamped from a continuous strip of sheet metal in one piece and thereafter formed by means of dies into its final form. The need for any assembly operations is eliminated and there is a minimum of scrap resulting.

By providing a channel-shaped cross section for the beam portion 45 of the bracket 12, said bracket is greatly strengthened and resistance thereof to lateral distortion under great wind forces is materially reduced if not substantially eliminated. It is believed that providing such great strength in a bracket of such relatively small size and weight is a highly desirable feature of the invention.

In the preferred embodiment of the invention the members 56 and 56' are shown mounted side by side on the roof portion 14 and on opposite sides of the center thereof. It is desired to point out that this arrangement is not intended to exclude other satisfactory positions for mounting said members 56 and 56'. Although not shown in the drawings, it will be understood that the said members also may be mounted on said roof portion 14 spaced from the center of the roof portion 14. Of course, suitable means will have to be provided on the visor to be engaged by said member. Also, the invention as described is intended to include the use of only one such member 56 or 56' mounted on one side of the center of the roof portion 14. The great strength of the said member by reason of the channel-shaped cross section and the relatively large base portion 44 permits such use of only one of said members 56 and 56' for supporting the center of the visor 11 satisfactorily.

It will be apparent that I have provided a novel and unique roof mount bracket for supporting an automobile visor which is simple to construct, easy to mount and which is sturdy and strong. It is believed that the invention has been fully described such that one skilled in the art will be enabled to construct same. Many minor modifications and variations may occur to those skilled in the art without departing from the spirit or scope of the invention as defined in the appended claims and it is not intended to be limited except by said claims.

What I claim is:

1. A bracket for supporting an automobile visor in proper shading relationship to an automobile windshield having a rigid roof portion contiguous the top thereof, said visor being secured at its ends alongside the windshield with the center thereof arranged to be supported by said bracket and having a fin depending from said center, said bracket comprising a pair of identical but oppositely formed members adapted to be mounted adjacent one another on opposite sides of center of the roof portion, each member having a base including a relatively large, substantially rectangular hollow portion having a flange encircling the same by means of which the base may be secured to said roof portion, a portion integral with and offset from said base and a straight portion bent from the offset portion, said offset and straight portions each being channel-shaped with one leg defining the channel being substantially longer than the other leg, each of said long legs being vertically arranged and spaced one from the other and adapted to be secured to said fin with the fin sandwiched therebetween.

2. A bracket for supporting an automobile visor in proper shading relationship to an automobile windshield having a rigid roof portion contiguous the top thereof, said visor being secured at its ends alongside the windshield with the center thereof arranged to be supported by said bracket and having a fin depending from said center, said bracket comprising a pair of identical but oppositely formed members adapted to be mounted adjacent one another on opposite sides of center of the roof portion, each member having a base including a relatively large, substantially rectangular hollow portion having a flange encircling the same by means of which the base may be secured to said roof portion, a portion integral with and offset from said base and a straight portion bent from the offset portion, said offset and straight portions each being channel-shaped with one leg defining the channel being substantially longer than the other leg, each of said long legs being vertically arranged and spaced one from the other and adapted to be secured to said fin with the fin sandwiched therebetween, said long legs each being continuous from a said base to its free end and the short leg of each member being likewise so continuously formed.

3. A bracket for supporting an automobile visor in proper shading relationship to an automobile windshield having a rigid roof portion contiguous the top thereof, said visor being secured at its ends alongside the windshield with the center thereof arranged to be supported by the bracket and having a fin depending from said center, said bracket having a base portion at one end thereof adapted to be secured to said roof portion of relatively large, substantially rectangular hollow formation having a flange encircling same by means of which said base may be so secured, and a forwardly directed beam member integral with said base portion, said beam having a portion offset from the base and a vertically arranged portion integral with said offset portion adapted to be secured to said fin, said beam member being channel-shaped with one leg of the channel comprising said vertically arranged portion.

References Cited in the file of this patent

UNITED STATES PATENTS

| Number | Name | Date |
| --- | --- | --- |
| 419,137 | Bobemerith | Jan. 7, 1890 |
| 508,816 | Craig | Nov. 14, 1893 |
| 1,006,268 | Peirce | Oct. 17, 1911 |
| 1,008,803 | Ely | Nov. 14, 1911 |
| 1,176,137 | Ette | Mar. 21, 1916 |
| 1,189,562 | Groehn et al. | July 4, 1916 |
| 1,399,356 | Lytle | Dec. 6, 1921 |
| 1,480,484 | Wertz | Jan. 8, 1924 |
| 1,486,594 | Malone | Mar. 11, 1924 |
| 2,339,515 | Parcher | Jan. 18, 1944 |
| 2,527,247 | Dieterich | Oct. 24, 1950 |